(12) United States Patent
Xiao et al.

(10) Patent No.: US 12,403,662 B2
(45) Date of Patent: Sep. 2, 2025

(54) DETERMINING BUILD ORIENTATION TO MINIMIZE THERMAL DISTORTION

(71) Applicant: The Penn State Research Foundation, State College, PA (US)

(72) Inventors: Xinyi Xiao, State College, PA (US); Sanjay B. Joshi, Port Matilda, PA (US); Timothy W. Simpson, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 582 days.

(21) Appl. No.: 17/756,139

(22) PCT Filed: Dec. 17, 2020

(86) PCT No.: PCT/US2020/065644
§ 371 (c)(1),
(2) Date: May 18, 2022

(87) PCT Pub. No.: WO2021/127201
PCT Pub. Date: Jun. 24, 2021

(65) Prior Publication Data
US 2022/0410489 A1    Dec. 29, 2022

Related U.S. Application Data

(60) Provisional application No. 62/950,218, filed on Dec. 19, 2019.

(51) Int. Cl.
*B29C 64/393*    (2017.01)
*B29C 64/245*    (2017.01)
(Continued)

(52) U.S. Cl.
CPC .......... *B29C 64/393* (2017.08); *B29C 64/245* (2017.08); *B33Y 50/02* (2014.12); *B29C 64/153* (2017.08); *B33Y 30/00* (2014.12)

(58) Field of Classification Search
CPC ... B29C 64/393; B29C 64/245; B29C 64/153; B29C 64/386; B33Y 50/02; B33Y 30/00;
(Continued)

(56) References Cited

U.S. PATENT DOCUMENTS 10,353,376 B2    7/2019  Huang et al.
2015/0352794 A1  12/2015 Nguyen et al.
(Continued)

FOREIGN PATENT DOCUMENTS

RU    2159201 C2    11/2000
RU    2436055 C2    12/2011
(Continued)

OTHER PUBLICATIONS

International Search Report and Written Opinion for PCT/US2020/065644 filed Dec. 17, 2020 dated Mar. 25, 2021.
(Continued)

*Primary Examiner* — Charles R Kasenge
(74) *Attorney, Agent, or Firm* — Buchanan Ingersoll & Rooney PC (57) ABSTRACT

Embodiments of the systems and methods disclosed herein can related to an additive manufacturing process involving the use of an algorithm to determine the optimal build orientation of a build that will result in minimal thermal distortion during the build. The algorithm includes a momentum of inertia based objective function, wherein the output of the objective function can be used as a proxy for thermal distortion. In some embodiments, objective function can be configured as a mathematical matrix with mathematical variables modeling rotation angles of a build. The rotation angles can be in the x-, y-, and/or z-geometric planes of the build with respect to the build plate. An objective function output can be calculated for each iterative rotation. The minimum objective function output can be
(Continued)

used as the rotation representing the orientation that would result in minimal thermal distortion.

13 Claims, 3 Drawing Sheets

(51) Int. Cl.
  *B33Y 50/02* (2015.01)
  *B29C 64/153* (2017.01)
  *B33Y 30/00* (2015.01)

(58) Field of Classification Search
  CPC .......... B33Y 50/00; B22F 10/38; B22F 10/80; B22F 10/28; Y02P 10/25; G06F 30/10; G06F 2119/08; G06F 2113/10
  See application file for complete search history.

(56) References Cited

U.S. PATENT DOCUMENTS

| | | |
|---|---|---|
| 2016/0224017 A1 | 8/2016 | Huang et al. |
| 2018/0104742 A1 | 4/2018 | Kottilingam et al. |
| 2022/0111424 A1* | 4/2022 | Gerlach ................ B33Y 40/20 |

FOREIGN PATENT DOCUMENTS

| | | |
|---|---|---|
| RU | 2690436 C2 | 6/2019 |
| RU | 2706104 C1 | 11/2019 |

OTHER PUBLICATIONS

Ning, J. et al., Analytical Modeling of In-Process Temperature in Powder Bed Additive Manufacturing Considering Laser Power Absorption, Latent Heat, Scanning Strategy, and Powder Packing, Materials, 2019, 1-16, 12, 808, www.mdpi.com/journal/materials.

Ning, J. et al., Analytical Thermal Modeling of Metal Additive Manufacturing by Heat Sink Solution, Materials 2019, pp. 1-15, 12, 2568, www.mdpi.com/journal/materials.

Peng, H. et al., Optimization of Build Orientation for Minimum Thermal Distortion in DMLS Metallic Additive Manufacturing, Solid Freeform Fabrication 2017: Proceedings of the 28th Annual International, Solid Freeform Fabrication Symposium—An Additive Manufacturing Conference, pp. 820-835.

Peng, H. et al., Part-scale model for fast prediction of thermal distortion in DMLS additive manufacturing; Part 2: a quasi-static thermomechanical model, Solid Freeform Fabrication 2016: Proceedings of the 27th Annual International Solid Freeform Fabrication Symposium—An Additive Manufacturing Conference, pp. 382-397.

* cited by examiner

DETERMINING BUILD ORIENTATION TO MINIMIZE THERMAL DISTORTION

CROSS-REFERENCE TO RELATED APPLICATIONS

This application is a U.S. national stage application under 35 U.S.C. § 371 for International Patent Application No. PCT/US2020/065644, filed Dec. 17, 2020, which is related to and claims the benefit of U.S. Provisional Application No. 62/950,218, filed on Dec. 19, 2019, the entire contents of each is incorporated herein by reference.

FILED OF THE INVENTION

Embodiments relate to systems and methods for determining an optimal building orientation of a build to minimize thermal distortion during additive manufacturing the build.

BACKGROUND OF THE INVENTION

Conventional systems and methods for determining build orientation and/or thermal distortion are limited to techniques that predict the actual thermal distortion before the build and/or provide real-time analysis of the part during the build. Such techniques can be time consuming, inaccurate, and/or require an inefficient amount of computational resources. Known system and methods can be appreciated from U.S. Pat. No. 10,353,376, U.S. 2015/0352794, U.S. 2016/0224017, U.S. 2018/0104742, *Optimization of Build Orientation for Minimum Thermal Distortion in DMLS Metallic Additive Manufacturing* by Hao Peng et al., *Analytical Thermal Modeling of Metal Additive Manufacturing by Heat Sink Solution* by Jinqiang Ning et al., *Analytical Modeling of In-Process Temperature in Powder Bed Additive Manufacturing Considering Laser Power Absorption, Latent Heat, Scanning Strategy, and Powder Packing* by Jinqiang Ning et al., and *Part-scale model for fast prediction of thermal distortion in DMLS additive manufacturing* by Hao Peng et al.

SUMMARY OF THE INVENTION

Embodiments of the systems and methods disclosed herein can related to an additive manufacturing process involving the use of an algorithm to determine the optimal build orientation of a build that will result in minimal thermal distortion during the build. The algorithm includes a momentum of inertia based objective function, wherein the output (a numerical value) of the objective function can be used as a proxy for thermal distortion. The process can be configured to use the output as a proxy for thermal distortion, as opposed to calculating or predicting the actual thermal distortion, thereby saving time and computational resources. For instance, the objective function can be modeled such that the greater the output of the objective function, the larger the thermal distortion will be for a given orientation. Similarly, the objective function can be modeled such that the lower the output of the objective function, the smaller the thermal distortion will be for a given orientation.

In some embodiments, objective function can be configured as a mathematical matrix with mathematical variables modeling rotation angles of a build. The rotation angles can be in the x-, y-, and/or z-geometric planes of the build with respect to the build plate—i.e., a given rotation can represent an orientation of the build. The momentum of inertia of the body of the build can be embedded as a variable in the matrix. An objective function output can be calculated for each iterative rotation. The minimum objective function output can be used as the rotation representing the orientation that would result in minimal thermal distortion.

In an exemplary embodiment, a method for determining a build orientation for a build involves: calculating an inertia tensor ($I_i$) of a build body from an as-designed geometry of a build; generating a matrix representative of a new inertia tenser ($I_{after}$) of the build body after an iterative rotation, $I_{after}$ being a function of $\alpha$ and $\beta$, wherein $\alpha$ is rotation of the build body along a first axis, and $\beta$ is rotation of the build body along a second axis; defining a geometric center of contracting area function $\overrightarrow{\text{(geometric center of contacting area)}}$, the $\overrightarrow{\text{geometric center of contacting area}}$ representing a center point of a contracting area of a geometry of the build body; iteratively changing $\alpha$ and/or $\beta$ and calculating the $\overrightarrow{\text{geometric center of contacting area}}$ for each change in $\alpha$ and/or $\beta$; using the $\overrightarrow{\text{geometric center of contacting area}}$ in an objective function to generate an output; and selecting an ($\alpha$, $\beta$) set based on the output, the ($\alpha$, $\beta$) set being used to determine the build orientation of the build body.

In some embodiments, the first axis is orthogonal to the second axis.

In some embodiments, the first axis is an X-axis of a build plate used in an additive manufacturing apparatus.

In some embodiments, the second axis is a Y-axis of a build plate used in an additive manufacturing apparatus.

In some embodiments, selecting the ($\alpha$, $\beta$) set involves selecting the ($\alpha$, $\beta$) set corresponding to the output having the smallest numerical value.

In some embodiments, generating the output involves generating a plurality of outputs.

In some embodiments, generating the plurality of outputs involves generating an output for each change in $\alpha$ and/or $\beta$.

In some embodiments, the method involves placing the plurality of outputs in an array, wherein the plurality of outputs is sorted or arranged in ascending or descending order.

In some embodiments:

$$I_{after} = R_y^* R_x^* I_i^* R_x'^* R_y'; R_x = \begin{bmatrix} 1 & 0 & 0 \\ 0 & \cos(\alpha) & -\sin(\alpha) \\ 0 & \sin(\alpha) & \cos(\alpha) \end{bmatrix};$$

$$R_y = \begin{bmatrix} \cos(\beta) & 0 & \sin(\beta) \\ 0 & 1 & 0 \\ -\sin(\beta) & 0 & \cos(\beta) \end{bmatrix};$$

$R_x'$ is the transpose of $R_x$; and $R_y'$ is the transpose of $R_y$.

In some embodiments, $R_x$ represents an iterative rotation of the build body within a first geometric plane; and $R_y$ represents an iterative rotation of the build body within a second geometric plane.

In some embodiments, the first geometric plane is orthogonal to the second geometric plane.

In some embodiments: the as-designed geometry is represented by matrix (num); the objective $$\text{Function} = \frac{\text{norm}[(I_{after} + m * I_{add}) * \text{vector}]}{\text{Height}};$$

norm is a mathematical function that operates to generate a scalar;

$$I_{after} = R_y^* R_x^* I_i^* R_x'^* R_y'; R_x = \begin{bmatrix} 1 & 0 & 0 \\ 0 & \cos(\alpha) & -\sin(\alpha) \\ 0 & \sin(\alpha) & \cos(\alpha) \end{bmatrix};$$

$$R_y = \begin{bmatrix} \cos(\beta) & 0 & \sin(\beta) \\ 0 & 1 & 0 \\ -\sin(\beta) & 0 & \cos(\beta) \end{bmatrix};$$

$R_x'$ is the transpose of $R_x$; $R_y'$ is the transpose of $R_y$; m=an expected mass of a part comprising the built body;

$$I_{add} = \begin{bmatrix} r_y^2 + r_z^2 & -r_x * r_y & -r_x * r_z \\ -r_x * r_y & r_x^2 + r_z^2 & -r_y * r_z \\ -r_x * r_z & -r_y * r_z & r_x^2 + r_y^2 \end{bmatrix}; \text{vector} = [r_x, r_y, r_z]; [r_x, r_y, r_z] =$$

$H_{1,new}$ − geometric center of contacting area + [0; 0;

offset height on the building plate]; $H_{1,new} = R_y^* R_x^* H_1'$; $H_1 = [r_x, r_y, r_z]$;

$H_1'$ is the transpose of $H_1$; numnew=$R_y*R_x*$num; and Height=max(numnew(3,:))−min(numnew(3,:)).

In some embodiments, the method involves incorporating the determined build orientation into an additive manufacturing file for use in an additive manufacturing process.

In an exemplary embodiment, a method for determining a build orientation for a build involves: determining a build orientation of a build body by generating an output to an objective function, the objective function using momentum of inertia of the build body and angle of rotation of the build body as variables; and wherein the output is a proxy for thermal distortion of the build body.

In some embodiments, the output is a numerical value; the greater the numerical value of the output, the greater the thermal distortion of the build body; and the lower the numerical value of the output, the less the thermal distortion of the build body.

In some embodiments, the angle of rotation associated with the lowest numerical value of the output represents the build orientation that will have the lowest thermal distortion.

In some embodiments, the method involves using the build orientation that will have the lowest thermal distortion in an additive manufacturing process to generate a part.

In some embodiments, the method involves incorporating the build orientation that will have the lowest thermal distortion into an additive manufacturing file for use in an additive manufacturing process.

In an exemplary embodiment, an additive manufacturing system includes: a processor; an energy source; a build plate located within a build chamber; and an additive manufacturing file including operating parameters configured to set an optimal build orientation for a build body within the build chamber. The optimal build orientation for the build body is determined by generating an output to an objective function, the objective function using momentum of inertia of the build body and angle of rotation of the build body as variables.

In some embodiments, the output is a proxy for thermal distortion of the build body.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings. Like reference numbers used in the drawings may identify like components.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of the present invention. The scope of the present invention is not limited by this description.

Figure 1:
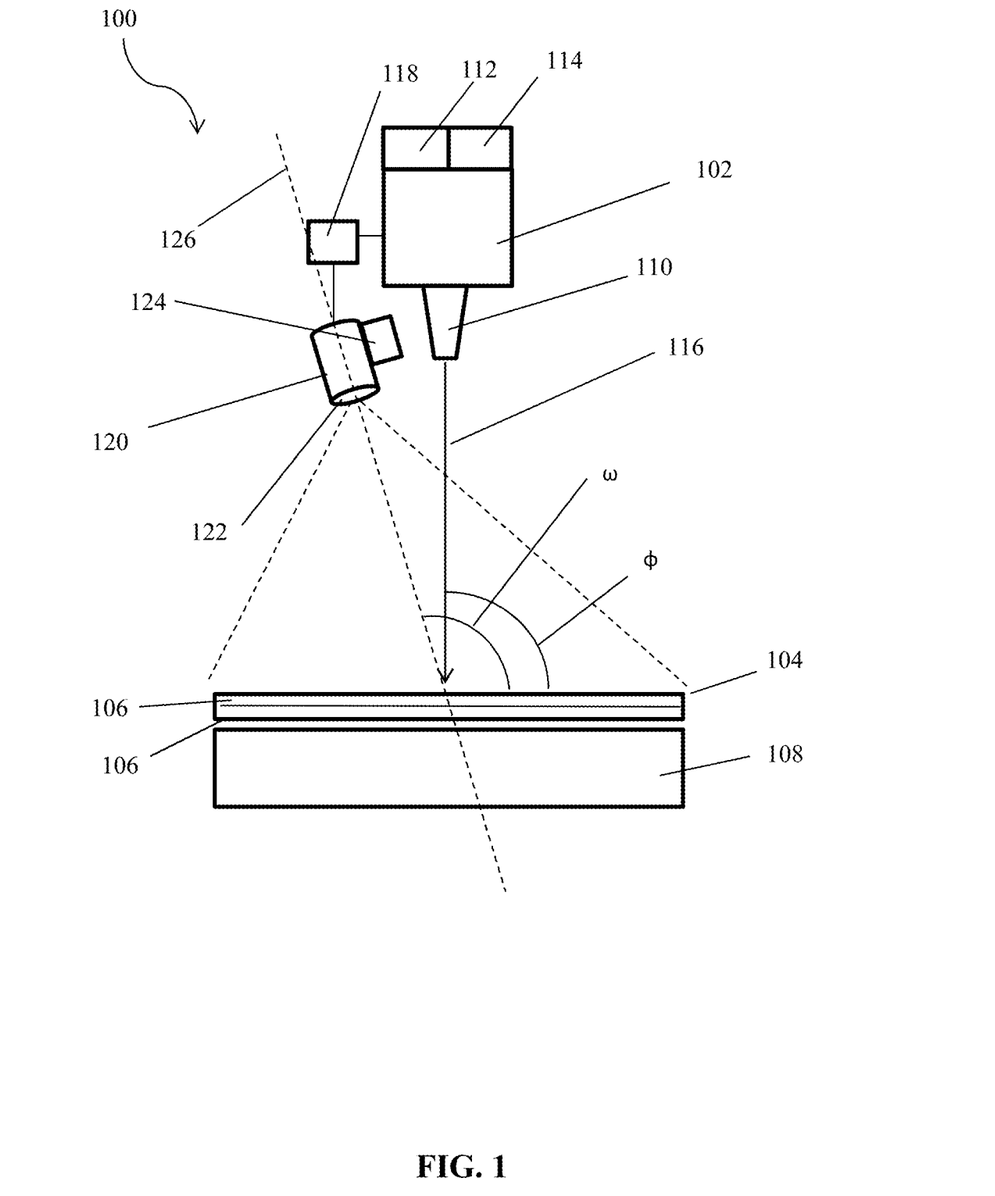
FIG. 1 shows an exemplary additive manufacturing architecture that can be used with an embodiment of a system.

It is contemplated for embodiments of the method to be used in an additive manufacturing process (e.g., Powder Bed Fusion Additive Manufacturing) to determine an optimal build orientation that will result in minimal thermal distortion of a build. The additive manufacturing process can be carried out using an additive manufacturing system 100. The system 100 can include an additive manufacturing apparatus (AMA) 102. The AMA 102 can be a machine configured to generate a part 104 by adding build material or components in a layer 106 by layer 106 fashion. In some embodiments, each layer 106 can be formed from a material (e.g., powdered material) being added to a portion of the part 104 as the part 104 is being fabricated. The part 104 may be referred to as a substrate.

The process of generating a part 104 in such a manner can be referred to as the build process or the build. The build can involve depositing a layer 106 of build material (a layer of build material may be referred to as a bed) on a build plate 108. The build material can be in powder form. An energy source 110 can be used to generate a plume or plasma of the build material. Upon cooling, the build material fuses together to form an integral piece of the part 104. Another layer 106 of build material can be deposited and the process can be continued. A build can involve formation of the part 104 by melting or fusing build material deposited in layers 106. While it is contemplated for each layer 106 to include the same build material, one layer 106 can be of a first type of build material and another layer 106 can be a second type of build material.

In some embodiments, the build plate 108 can be moved downward to after each layer 106 is deposited during the build. The type of build material, the layer 106 thickness, the movement of the energy source 110, the movement of the build plate 108, etc. can be controlled via a processor 112 that has been programmed to execute operations in accordance with an additive manufacturing file. The additive manufacturing file can be program logic that has build material specifications (e.g., material and chemical characteristics) and operating parameters (e.g., energy source 110 power, energy source 110 movement, build plate 108 movement, a three-dimensional profile scan of the part, etc.) specific for the build of the part 104 stored in non-transitory memory 114 that defines a method that the processor 112 utilizes as the processor 112 controls the performance of the additive manufacturing process.

The parameters within the additive manufacturing file can include the build orientation of the build. As explained herein, the processor 112 can be further programmed to include an embodiment of the momentum of inertia based objective function ("objective function"). The processor 112 can be configured to determine the optimal build orientation using the objective function, and incorporate that optimal build orientation into the additive manufacturing file (e.g., the operating parameters set forth in the additive manufacturing file are set so that the orientation of the build is set as the optimal build orientation). As noted herein, the optimal build orientation can be the orientation that will minimize thermal distortion of the build. The processor 112 used to execute the objective function and/or generate the additive manufacturing file can be the same as the processor 112 controlling the AMA 102 or can be a separate processor 112. If the processor 112 used to generate the additive manufacturing file is different from the processor 112 controlling the AMA 102, the processors 112 can be in communication with each other via a communication network to allow for transfer of the additive manufacturing file to the processor 112 of the AMA 102. Any of the processors 112 can be a central processing unit (CPU), a controller, one or more microprocessors, a core processor, an array of processors, a control circuit, or other type of hardware processor device.

In an exemplary embodiment, the AMA 102 can have a laser 110 as the energy source 110. The laser 110 can be used to impart a laser beam 116 on the layer 106 to generate a laser interaction zone. The laser interaction zone can be the portion of the layer 106 where the plasma is being formed. The laser interaction zone can include a melt pool and a plume. The melt pool can be a liquid formation of the build material. The plume can be a plasma and/or vapor formation of the build material and may include components of the surrounding atmosphere. The plume can be formed adjacent the melt pool. For example, the melt pool can be a liquid build material region at or near the surface of the build material where the laser beam 116 makes contact with the build material. The plume can be an elongated mobile column of plasma or vapor of build material extending upward from the melt pool.

The AMA 102 can include a monitoring unit 118. The monitoring unit 118 can include processors, sensors, and other circuitry configured to provide real-time measurements of the build (e.g., record data and analyze data related to the operational parameters of the AMA 102). The operational parameters can include laser 110 triggering (e.g., the laser 110 turning on and off), laser 110 power, laser 110 position, laser 110 movement, build plate 108 movement, build layer 106 number, feed rate of the build material, etc.

The AMA 102 can include a multi-spectral sensor 120. An embodiment of the multi-spectral sensor 120 can be configured to receive electromagnetic emission light from the surface of the build material. This can include receiving electromagnetic emission light generated due to material interactions of the build material via the laser beam 116. The multi-spectral sensor 120 can be configured to detect material interactions via received electromagnetic emission light by spectral analysis. For example, the multi-spectral sensor 120 can include an optical receiver 122 configured to direct the electromagnetic emission light to photo sensors that can convert the light into spectral data. In some embodiments, the multi-spectral sensor 120 can include an optical emission spectrometer 124 configured to analyze the detected light via spectral analysis. The multi-spectral sensor 120 can be configured to be communicatively associated with the optical emission spectrometer 124 or the optical emission spectrometer 124 can be part of the multi-spectral sensor 120.

The laser 110 can be configured so that the laser beam 116 being emitted there-from is incident upon the surface of the building material layer 106 at an angle $\varphi$. $\varphi$ can be defined as an angle of the laser beam 116 relative to a geometric plane of the surface of the building material layer 106. For example, optical elements (e.g., lenses, prisms, mirrors, reflectors, refractors, collimators, beam splitters, etc.) and actuators (e.g., microelectromechanical system (MEMS), gimbal assemblies, etc.) of the laser 110 can be used to direct the laser beam 116 in a predetermined direction so that it is incident upon the building material layer 106 at $\varphi$. Any of the actuators can be actuated to cause a to be constant or to vary. The multi-spectral sensor 120 can be configured to receive electromagnetic emission light from the surface at an angle $\omega$. $\omega$ can be defined as an angle of the optical receiver's axis 126 of the multi-spectral sensor 120 relative to the geometric plane that is the surface of the building material layer 106. Optical elements and actuators of the multi-spectral sensor 120 can be used to cause the multi-spectral sensor 120 to be positioned at $\omega$. Any of the actuators can be actuated to cause $\omega$ to be constant or to vary.

Figure 2:
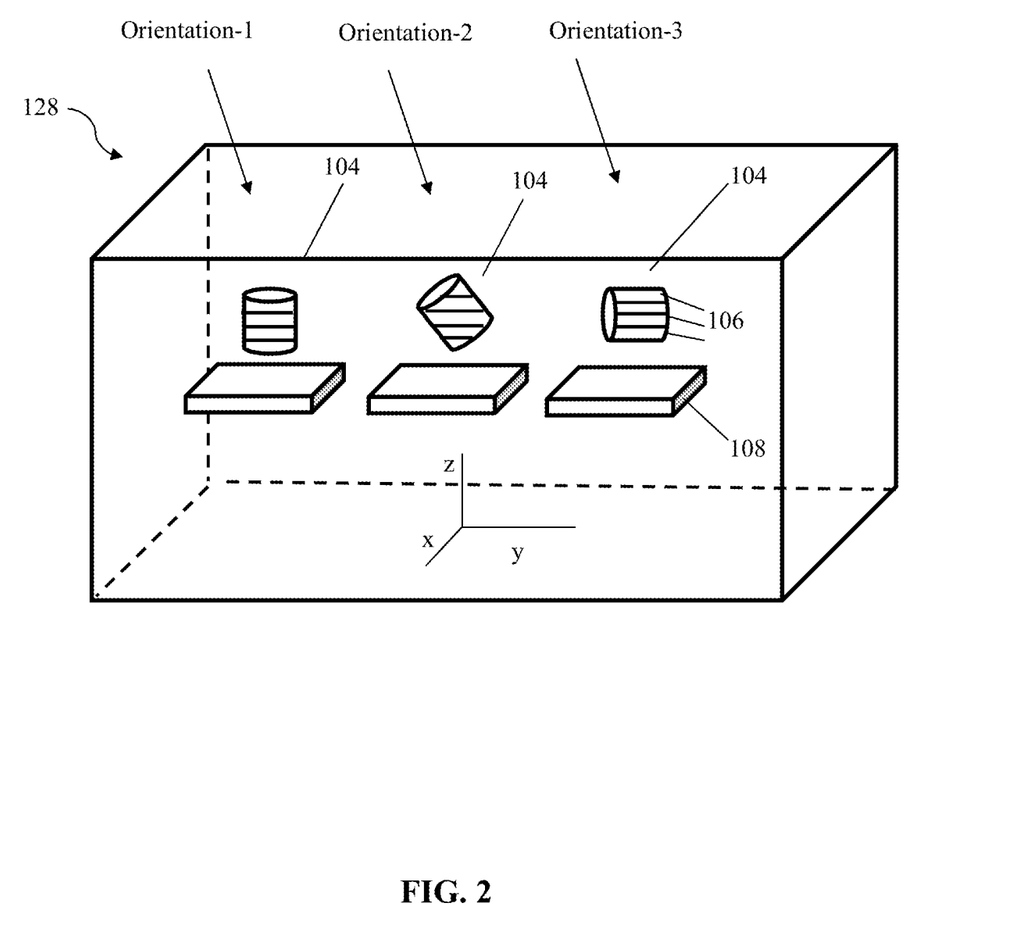
FIG. 2 shows exemplary build orientations can be used with an embodiment of the system.

Referring to FIG. 2, the orientation of the build can include the position of the part in the x, y, z planes of the build chamber 128 of the AMA 102. The build plate 108 can be a planar object having an x-plane, a y-plane, and a z-plane that are parallel to the x-plane, the y-plane, and the z-plane, respectively, of the build chamber 128, and thus the x, y, z planes of the build plate 108 can be the same as the x, y, z planes of the build chamber 128. As a non-limiting example, if the part 104 is a cylindrical bar, for example, having a longitudinal axis running along the elongated portion of the bar, the relative position of the longitudinal axis with respect to the z-axis of the x, y, z plane of the build plate 108 would define the orientation. As seen in FIG. 2, if, during the build, the longitudinal axis of the cylindrical bar is parallel (e.g., at a 0-degree angle with respect to the z-axis), then the build orientation is illustrated as orientation-1. If, during the build, the longitudinal axis of the cylindrical bar is canted (e.g., at a 45-degree angle with respect to the z-axis), then the build orientation is illustrated as orientation-2. If, during the build, the longitudinal axis of the cylindrical bar is normal (e.g., at a 90-degree angle with respect to the z-axis), then the build orientation is illustrated as orientation-3. The build orientations described above are exemplary only. It is understood that other orientations, orientations relative to the y-plane (or y-axis), the x-plane (or x-axis), and/or the x, y, and/or z-planes (or x, y-, and/or z-axes), etc. can be used.

As noted herein, the process can involve use of an objective function to determine the optimal build orientation. The objective function contains a plurality of variables that may require input from a user, data acquisition by the processor 112, and/or calculations performed by the processor 112. Each of these variables and how they are used by the objective function will be discussed next.

As-Designed Geometry

A user defines the part 104 to be built via a set of geometry parameters (e.g., height, width, length, etc.). The geometry parameters can be referred to as the as-designed geometry of the part 104, or the as-designed geometry. The as-designed geometry can include a height H, a width D, and a length L. Using numerical methods and matrix modeling, the as-designed geometry can be represented by a matrix of numerical values. This matrix of numerical values can be referred to herein as num. num can be values that represent coordinate points on the as-designed geometry of the body of the build. As noted herein, the build plate 108 can be a planar object having an x-plane, a y-plane, and a z-plane. The center of the build plate 108 can be the center of a Cartesian coordinate system in which the intersection of the x-plane, y-plane, and z-plane is represented by [x,y,z]=[0, 0,0,]. A user can use the as-designed geometry to set the geometry orientation of the build to be [L/2, W/2, 0]=[0,0,0]. For instance, the as-designed geometry can include num, num being a matrix of values representing a plurality of points on the body of the as-designed geometry. Setting the geometry orientation of the build can involve taking the coordinates representing the L and W of the as-designed geometry, dividing each by 2, and then setting [L/2, W/2, 0]=[0,0,0].

Initial Inertia Tensor of the Build Body $I_i$ $I_i$ is a fixed matrix of known variables (i.e., numerical values of the variables are known and inputted into the matrix) determined by (e.g., calculated by) the as-designed geometry and geometry orientation inputs. In some embodiments, $I_i$ can be used to check if the geometry orientation has been set up correctly. As will be explained, $I_i$ will be used in the objective function to calculate $I_{after}$.

New Inertia Tenser after a Rotation $I_{after}$ $I_{after}$ is a matrix with two unknown variables, $\alpha$ and $\beta$.

$$I_{after} = R_y^* R_x^* I_i^* R_x'^* R_y'$$

$$R_x = \begin{bmatrix} 1 & 0 & 0 \\ 0 & \cos(\alpha) & -\sin(\alpha) \\ 0 & \sin(\alpha) & \cos(\alpha) \end{bmatrix}; R_y = \begin{bmatrix} \cos(\beta) & 0 & \sin(\beta) \\ 0 & 1 & 0 \\ -\sin(\beta) & 0 & \cos(\beta) \end{bmatrix}$$

$R_x$ represents an iterative rotation of the body within the x-plane of the build plate 108.

$R_y$ represents an iterative rotation of the body within the y-plane of the build plate 108.

$\alpha$ is rotation of the body along the X-axis of the build plate 108.

$\beta$ is rotation of the body along the Y-axis of the build plate 108.

$\alpha$ and $\beta$ are unknown variables that will be computationally iterated via the objective function.

Each of $R_x$ and $R_y$ can be constrained between [−180, 180].

$R_x'$ is the transpose of $R_x$.
$R_y'$ is the transpose of $R_y$.

The Objective Function $$\text{Objective Function} = \frac{\text{norm}[(I_{after} + m * I_{add}) * \text{vector}]}{\text{Height}}$$

norm is a mathematical function that operates to generate a scalar, the scalar being a measure of the magnitude of the elements of in a matrix.

$I_{after}$ is defined above.

m=expected mass of the part 104 after being built. m can be calculated by multiplying the volume (e.g., using the as-designed geometry) of the part 104 by the density of material used to build the part 104.

$$I_{add} = \begin{bmatrix} r_y^2 + r_z^2 & -r_x * r_y & -r_x * r_z \\ -r_x * r_y & r_x^2 + r_z^2 & -r_y * r_z \\ -r_x * r_z & -r_y * r_z & r_x^2 + r_y^2 \end{bmatrix}$$

vector = $[r_x, r_y, r_z]$ $[r_x, r_y, r_z]$ =

$\overline{H_1 \text{new}}$ − $\overline{\text{geometric center of contacting area}}$ + [0; 0; offset height on the building plate]

$[r_x, r_y, r_z]$ = the *geoetric* center of mass of the body when the base center of the geometry is located at [0, 0, 0]

The base center is the center of the as-design geometry in the X-Y plane. In some embodiments, the as-designed geometry is determined using Computer Aided Drawing (CAD) software. The CAD can be used to define a bounding box (a length, width, and height within which the part 104 will reside when built) for the as-designed geometry. With such embodiments, the center of the as-design geometry in the X-Y plane is the center of the bounding box in a CAD program model. In some embodiments, the base center can be automatically shifted to the [0,0,0] in the CAD model.

$\overline{H_1 \text{new}}$ = the new center of mass after rotation=$R_y*R_x*H_1'$ $H_1 = [r_x, r_y, r_z]$ $H_1'$ is the transpose of $H_1$ Thus, $\overline{H_1 \text{new}}$ is calculated by $H_1'$ and ($\alpha$), ($\beta$)

$\overline{H_1 \text{new}}$ new will be a matrix with ($\alpha$), ($\beta$)

Figure 3:
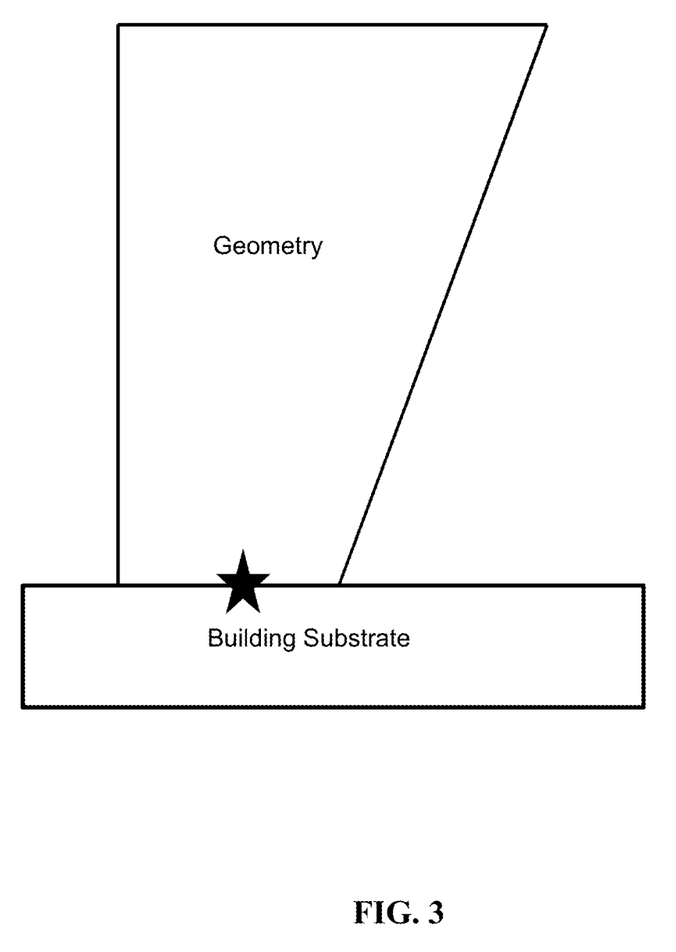
FIG. 3 shows an exemplary contracting area of a geometry.

$\overline{\text{geometric center of contacting area}}$ is a center point of a contracting area of a geometry. FIG. 3 shows a star located at a center point of a contracting area of a geometry.

$\overline{\text{geometric center of contacting area}}$ is the factor of the objective function that correlates to thermal distortion. As will be explained later, $\overline{\text{geometric center of contacting area}}$ is related to $I_{after}$, which allows for a measure of momentum of inertia to be used as a proxy for thermal distortion.

Offset height on the building plate is a parameter that a user can define via adjustments to the AMA 102. For instance, an AMA 102 may include a feature to allow for adjusting the z-axis offset to obtain a preferred distance between the build plate 108 and the laser tip or laser nozzle. This can be done for any one or combination of a multitude of reasons (e.g., when printing directly on top of an existing object, embedding objects within the build, etc.).

numnew numnew can be a matrix of numerical values that represent coordinate points on the as-designed geometry of the body of the build after an iterative rotation. numnew can be calculated for each set of $\alpha$, $\beta$.

numnew=$R_y*R_x*$num

After numnew is determined for a given iteration, the H, W, and L of the as-designed geometry of the body of the build after the iterative rotation can be calculated.

H=max(numnew(3,:))−min(numnew(3,:))

W=max(numnew(2,:))−min(numnew(2,:))

L=max(numnew(1,:))−min(numnew(1,:))

The objective function can then be solved for $\overline{\text{geometric center of contacting area}}$ for each set of ($\alpha$), ($\beta$).

For each set of ($\alpha$), ($\beta$), the $\overline{\text{geometric center of contacting area}}$ changes, which in turn effects $I_{after}$. A change in $I_{after}$ causes the output of the objective function to increase or decrease.

Instead of calculating the actual thermal distortion for each possible orientation of the build, the method disclosed herein uses the outputs of the objective function for a plurality of rotations (set of ($\alpha$), ($\beta$)) as proxies. With $I_{after}$ being related to $\overline{\text{geometric center of contacting area}}$, the output of the objective function can correlate with expected thermal distortion at a given rotation (each rotation being representative of a different orientation of the build). Thus, the objective function can be modeled such that the greater the output of the objective function, the larger the thermal distortion will be for a given orientation. Similarly, the objective function can be modeled such that the lower the output of the objective function, the smaller the thermal distortion will be for a given orientation. Thus, a plurality of objective function outputs can be calculated for a plurality of $\alpha$, $\beta$ sets. The minimum objective function output from the plurality of $\alpha$, $\beta$ sets can be used as the rotation (e.g., the $\alpha$, $\beta$ set) that will result in the optimal geometry orientation for the build, the optimal geometry orientation being the orientation that will minimize thermal distortion. The optimal geometry orientation can then be used as the orientation in the additive manufacturing file.

In some embodiments, the plurality of objective function outputs can be placed in an array to be sorted or arranged in ascending or descending order. The method can involve selecting the minimum objective function output and use it to set the optimal geometry orientation. As an alternative, a user may desire to trade-off minimizing thermal distortion with other factors, and thus select an objective function output that is not the minimum and use that to set as the optimal geometry orientation. This would not result in the orientation that would minimize thermal distortion but rather minimize it to extent doing so satisfies another constraint.

It should be noted that conventional systems and methods that calculate the actual thermal distortion for possible orientations can takes 10-30 minutes to determine an optimal orientation. Further, conventional systems and methods lack the computational capacity to practically and efficiently compute each possible orientation. With embodiments of the system and method disclosed herein, however, the optimal orientation can be calculated in less than 0.05 seconds per iteration (e.g., per set of $\alpha$, $\beta$), and can calculate an objective function output for each possible orientation.

As exemplary implementation can be performed in the following manner. A user can define the part 104 to be built as an as-designed geometry. This can be performed using CAD software. The as-designed geometry can be defined as num. num can be values that represent coordinate points on the as-designed geometry of the body of the build. $I_i$ (the initial inertia tensor of the build body) can be determined for the as-designed geometry. $I_i$ can be modeled as a fixed matrix of known variables. A matrix for $I_{after}$ (the new inertia tenser after a rotation) can be defined. The $I_{after}$ can be a matrix with two unknown variables, $\alpha$ and $\beta$. An ($\alpha$, $\beta$) set can be used to represent a rotation for the body—i.e., each $\alpha$, $\beta$ set can represent an orientation for the body. $I_{after}$ can be set to $=R_y*R_x*I_i*R_x'*R_y'$, wherein:

$$R_x = \begin{bmatrix} 1 & 0 & 0 \\ 0 & \cos(\alpha) & -\sin(\alpha) \\ 0 & \sin(\alpha) & \cos(\alpha) \end{bmatrix}; R_y = \begin{bmatrix} \cos(\beta) & 0 & \sin(\beta) \\ 0 & 1 & 0 \\ -\sin(\beta) & 0 & \cos(\beta) \end{bmatrix};$$

$R_x$ represents an iterative rotation of the body within the x-plane of the build plate 108; $R_y$ represents an iterative rotation of the body within the y-plane of the build plate 108; $\alpha$ is rotation of the body along the X-axis of the build plate 108; and $\beta$ is rotation of the body along the Y-axis of the build plate 108.

$\alpha$ and $\beta$ are unknown variables. $\alpha$ and $\beta$ can be computationally iterated by the processor 112 to generate a plurality of ($\alpha$, $\beta$) sets. In some embodiments, upper and/or lower bounds can be set for $\alpha$ and $\beta$ so that each of $R_x$ and $R_y$ can be constrained between [−180, 180].

An objective function can be defined as:

$$\text{Objective Function} = \frac{\text{norm}[(I_{after} + m * I_{add}) * \text{vector}]}{\text{Height}}$$

m can be calculated by multiplying the volume (e.g., using the as-designed geometry) of the part 104 by the density of material used to build the part 104.

$I_{add}$ can be defined as:

$$I_{add} = \begin{bmatrix} r_y^2 + r_z^2 & -r_x*r_y & -r_x*r_z \\ -r_x*r_y & r_x^2 + r_z^2 & -r_y*r_z \\ -r_x*r_z & -r_y*r_z & r_x^2 + r_y^2 \end{bmatrix},$$

wherein:
vector=$[r_x,r_y,r_z]$;

$[r_x,r_y,r_z]=\overline{H_1 \text{new}} - \overline{\text{geometric center of contacting area}} +$ [0; 0; offset height on the building plate];

$[r_x, r_y, r_z]$=the geometric center of mass of the body when the base center of the geometry is located at [0,0,0];

the base center can be defined as the center of the as-design geometry in the X-Y plane;

$\overline{H_1 \text{new}}$ can =the new center of mass after rotation and can $=R_y*R_x*H_1'$;

$H_1$ can $=[r_x, r_y, r_z]$;

$\overline{\text{geometric center of contacting area}}$ can represent a center point of a contracting area of a geometry;

offset height on the building plate can be a parameter that a user may define via adjustments to the z-axis offset to the AMA 102.

The processor 112 can then iteratively generate a ($\alpha$, $\beta$) set, each ($\alpha$, $\beta$) set representing a possible orientation of the body of the build. The number of ($\alpha$, $\beta$) sets and the range of values between $\alpha$ and $\alpha_{+1}$ ($\alpha_{+1}$ being the next iterative $\alpha$) and/or between $\beta$ and $\beta_{+1}$ ($\beta_{+1}$ being the next iterative $\beta$) can be determined based on the design objectives, computational resources, the desire for accuracy, the desire for speed of computation, etc.

A numnew can be calculated for each ($\alpha$, $\beta$) set, wherein numnew can $=R_y*R_x*$num.

The H, W, and L of the as-designed geometry of the body of the build after each iterative rotation can be calculated by:

$H$=max(numnew(3,:))−min(numnew(3,:));

$W$=max(numnew(2,:))−min(numnew(2,:));

$L$=max(numnew(1,:))−min(numnew(1,:)).

The $\overline{\text{geometric center of contacting area}}$ for each ($\alpha$, $\beta$) set can be solved via the objective function as an output of the objective function for a given ($\alpha$, $\beta$) set. A plurality of objective function outputs can be placed in an array. The array of objective function outputs can be sorted or arranged in ascending or descending order. The method can involve selecting the minimum (minimum value) objective function output. The ($\alpha$, $\beta$) set associated with the minimum objective function output can be selected to represent the optimal orientation of the build that will result in minimal thermal distortion. The optimal orientation can be incorporated into the additive manufacturing file (e.g., the operating parameters set forth in the additive manufacturing file are set so that the orientation of the build is set as the optimal build orientation) so that the processor 112 of the AMA 102 executes the build in accordance with the optimal orientation.

It should be understood that modifications to the embodiments disclosed herein can be made to meet a particular set of design criteria. It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

Therefore, it is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of apparatuses and methods of making and using the same have been discussed and illustrated herein, it is to be distinctly understood that the invention is not limited thereto but may be otherwise variously embodied and practiced within the scope of the following claims.

What is claimed is:

1. A method for determining a build orientation for a build, the method comprising:
   causing a processor of an additive manufacturing machine to receive information about a build and to use an algorithm stored in memory of the processor for:
   calculating an inertia tensor ($I_i$) of a build body from an as-designed geometry of a build;
   generating a matrix representative of a new inertia tensor ($I_{after}$) of the build body after an iterative rotation, $I_{after}$ being a function of $\alpha$ and $\beta$, wherein $\alpha$ is rotation of the build body along a first axis, and $\beta$ is rotation of the build body along a second axis;
   defining a geometric center of contracting area function $\overline{(\text{geometric center of contacting area})}$, the $\overline{\text{geometric center of contacting area}}$ representing a center point of a contracting area of a geometry of the build body;
   iteratively changing $\alpha$ and/or $\beta$ and calculating the $\overline{\text{geometric center of contacting area}}$ for each change in $\alpha$ and/or $\beta$;
   using the $\overline{\text{geometric center of contacting area}}$ in an objective function to generate an output; and
   selecting an ($\alpha$, $\beta$) set based on the output, the ($\alpha$, $\beta$) set being used to determine the build orientation of the build body.

2. The method of claim 1, wherein:
the first axis is orthogonal to the second axis.

3. The method of claim 1, wherein:
the first axis is an X-axis of a build plate used in an additive manufacturing apparatus.

4. The method of claim 1, wherein:
the second axis is a Y-axis of a build plate used in an additive manufacturing apparatus.

5. The method of claim 1, wherein:
selecting the ($\alpha$, $\beta$) set involves selecting the ($\alpha$, $\beta$) set corresponding to the output having the smallest numerical value.

6. The method of claim 1, wherein:
generating the output involves generating a plurality of outputs.

7. The method of claim 6, wherein:
generating the plurality of outputs involves generating an output for each change in $\alpha$ and/or $\beta$.

8. The method of claim 6, further comprising:
placing the plurality of outputs in an array, wherein the plurality of outputs is sorted or arranged in ascending or descending order.

9. The method of claim 1, wherein:

$$I_{after} = R_y * R_x * I_i * R_x' * R_y';$$

$$R_x = \begin{bmatrix} 1 & 0 & 0 \\ 0 & \cos(\alpha) & -\sin(\alpha) \\ 0 & \sin(\alpha) & \cos(\alpha) \end{bmatrix}, R_y = \begin{bmatrix} \cos(\beta) & 0 & \sin(\beta) \\ 0 & 1 & 0 \\ -\sin(\beta) & 0 & \cos(\beta) \end{bmatrix};$$

$R_x'$ is the transpose of $R_x$; and
$R_y'$ is the transpose of $R_y$.

10. The method of claim 9, wherein:
$R_x$ represents an iterative rotation of the build body within a first geometric plane; and
$R_y$ represents an iterative rotation of the build body within a second geometric plane.

11. The method of claim 10, wherein:
the first geometric plane is orthogonal to the second geometric plane.

12. The method of claim 1, wherein:
the as-designed geometry is represented by matrix (num);
the objective $$\text{Function} = \frac{\text{norm}[(I_{after} + m * I_{add}) * \text{vector}]}{\text{Height}};$$

norm is a mathematical function that operates to generate a scalar;

$$I_{after} = R_y^* R_x^* I_i^* R_x'^* R_y';$$

$$R_x = \begin{bmatrix} 1 & 0 & 0 \\ 0 & \cos(\alpha) & -\sin(\alpha) \\ 0 & \sin(\alpha) & \cos(\alpha) \end{bmatrix}; R_y = \begin{bmatrix} \cos(\beta) & 0 & \sin(\beta) \\ 0 & 1 & 0 \\ -\sin(\beta) & 0 & \cos(\beta) \end{bmatrix};$$

$R_x'$ is the transpose of $R_x$;
$R_y'$ is the transpose of $R_y$;
m=an expected mass of a part comprising the built body;

$$I_{add} = \begin{bmatrix} r_y^2 + r_z^2 & -r_x * r_y & -r_x * r_z \\ -r_x * r_y & r_x^2 + r_z^2 & -r_y * r_z \\ -r_x * r_z & -r_y * r_z & r_x^2 + r_y^2 \end{bmatrix};$$

vector = $[r_x, r_y, r_z]$;

$[r_x, r_y, r_z] = \overline{H_{1,new}} - \text{geometric center of contacting area} +$

[0; 0; offset height on the building plate];

$\overline{H_{1,new}} = R_y^* R_x^* H_1'$;

$H_1 = [r_x, r_y, r_z]$;

$H_1'$ is the transpose of $H_1$;
numnew=$R_y*R_x*$num; and

Height=max(numnew(3,:))−min(numnew(3,:)).

13. The method of claim 1, further comprising:
incorporating the determined build orientation into an additive manufacturing file for use in an additive manufacturing process.

* * * * *